(12) United States Patent
Nagarajan et al.

(10) Patent No.: US 7,961,725 B2
(45) Date of Patent: Jun. 14, 2011

(54) ENTERPRISE NETWORK ARCHITECTURE FOR IMPLEMENTING A VIRTUAL PRIVATE NETWORK FOR WIRELESS USERS BY MAPPING WIRELESS LANS TO IP TUNNELS

(75) Inventors: Ramakrishnan Nagarajan, Sunnyvale, CA (US); Udayan Borkar, Sunnyvale, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 404 days.

(21) Appl. No.: 11/831,315

(22) Filed: Jul. 31, 2007

(65) Prior Publication Data
US 2009/0034431 A1    Feb. 5, 2009

(51) Int. Cl.
*H04J 3/16* (2006.01)
(52) U.S. Cl. ........ 370/389; 370/230; 370/231; 370/401; 370/328
(58) Field of Classification Search .................. 370/382, 370/389, 230, 231, 401, 328
See application file for complete search history.

(56) References Cited

U.S. PATENT DOCUMENTS

| | | | |
|---|---|---|---|
| 7,310,356 B2 * | 12/2007 | Abdo et al. | 370/522 |
| 7,386,889 B2 * | 6/2008 | Shay | 726/26 |
| 7,574,202 B1 * | 8/2009 | Tsao et al. | 455/411 |
| 2004/0066769 A1 * | 4/2004 | Ahmavaara et al. | 370/338 |
| 2006/0046728 A1 * | 3/2006 | Jung et al. | 455/445 |
| 2006/0050696 A1 * | 3/2006 | Shah et al. | 370/389 |
| 2006/0153122 A1 * | 7/2006 | Hinman et al. | 370/328 |
| 2006/0200543 A1 * | 9/2006 | Kong et al. | 709/223 |
| 2006/0227950 A1 * | 10/2006 | Mielich et al. | 379/142.14 |
| 2006/0256763 A1 * | 11/2006 | Nguyen et al. | 370/338 |
| 2007/0280240 A1 * | 12/2007 | Beach | 370/392 |
| 2008/0019302 A1 * | 1/2008 | Nagarajan et al. | 370/328 |
| 2008/0080508 A1 * | 4/2008 | Das et al. | 370/392 |
| 2008/0101291 A1 * | 5/2008 | Jiang et al. | 370/331 |
| 2008/0205345 A1 * | 8/2008 | Sachs et al. | 370/332 |

* cited by examiner

*Primary Examiner* — Daniel J Ryman
*Assistant Examiner* — Jay P Patel

(57) ABSTRACT

An enterprise network is provided which includes a central site, a network and a remote site communicatively coupled to the central site over the network. The central site includes a first termination device in communication with a restricted network segment including at least one server. The remote site includes an infrastructure device, an authorized access wireless local area network (WLAN), and an unauthorized access WLAN. The infrastructure device comprises a second termination device which communicates with the first termination device over the network. The authorized access WLAN allow communications with the central site via the second termination device over a tunnel coupling the first termination device to the second termination device, whereas the unauthorized access WLAN allows communications with the network via the second termination device.

8 Claims, 4 Drawing Sheets

| WIRELESS COMPUTING DEVICE DATABASE (WCDD) | | | | | |
|---|---|---|---|---|---|
| WCD | MAC ADDRESS OF WCD | IP ADDRESS OF WCD | ASSOCIATED WLAN OF WCD | WLAN-TO-VLAN MAPPING | WLAN-TO-TUNNEL MAPPING |
| WCD 162A | MAC 162A | IP 162A | UNAUTHORIZED ACCESS WLAN 161 | UNAUTHORIZED ACCESS WLAN 161, LOCAL-VLAN161 | NONE |
| WCD 162B | MAC 162B | IP 162B | UNAUTHORIZED ACCESS WLAN 161 | UNAUTHORIZED ACCESS WLAN 161, LOCAL-VLAN161 | NONE |
| WCD 160A | MAC 160A | IP 160A | AUTHORIZED ACCESS WLAN 158 | NONE | AUTHORIZED ACCESS WLAN 158, TUNNEL 125 |
| WCD 160B | MAC 160B | IP 160B | AUTHORIZED ACCESS WLAN 158 | NONE | AUTHORIZED ACCESS WLAN 158, TUNNEL 125 |

FIG. 2

ENTERPRISE NETWORK ARCHITECTURE FOR IMPLEMENTING A VIRTUAL PRIVATE NETWORK FOR WIRELESS USERS BY MAPPING WIRELESS LANS TO IP TUNNELS

FIELD OF THE INVENTION

The present invention generally relates to communication in enterprise networks, and more particularly relates to securing an enterprise network.

BACKGROUND OF THE INVENTION

An enterprise network typically includes a central site which is located at a particular physical location (e.g., a main office on a particular enterprise), and a number of remote physical sites which include their own local area networks (LANs). Each remote physical site (e.g., a branch office) includes one or more remote sites which communicate with the central site via the Internet. Among other things, network applications, data or services are often maintained at the central site. Among other functions, the central site is generally responsible for managing communications to and from a large number of wireless communication devices which can be distributed throughout the physical sites which are part of the enterprise network. In some cases, the central site can be responsible for managing thousands of wireless communication devices which can be distributed among the various physical and/or remote sites that make up the enterprise network (e.g., in retail environment). This way wireless communication devices located at the remote physical sites can access network applications, data or services which are maintained at the central site. For example, one common scenario would be where a user at the remote site wants to access data maintained at the central site (e.g., where a store clerk wants to inquire about availability of a certain product).

It is desirable to restrict access to certain network applications, data or services so that only "authorized" network users at the remote site can access them. At the same time, it is also desirable to allow other "unauthorized" network users to access the Internet and/or a limited portion of the network applications, data or services maintained at the central site via the WLAN at the remote site. For instance, in one scenario where the enterprise is grocery store chain, it would be desirable to allow guests or prospective customers who are at the store to access the Internet via a WLAN at one of the grocery stores that is part of the chain.

Accordingly, it is desirable to provide improved techniques for restricting access to applications, data and services maintained at a central site of an enterprise network. It is also desirable to give "unauthorized" users access to a limited number of services without allowing such unauthorized users to also access all of the network applications, data or services maintained at the central site. Furthermore, other desirable features and characteristics of the present invention will become apparent from the subsequent detailed description of the invention and the appended claims, taken in conjunction with the accompanying drawings and this background of the invention.

BRIEF SUMMARY

An enterprise network is provided which includes a central site, a network and a remote site communicatively coupled to the central site over the network. The central site includes a first termination device in communication with a restricted network segment including at least one server. The remote site includes an infrastructure device, an authorized access wireless local area network (WLAN), and an unauthorized access WLAN. The infrastructure device comprises a second termination device which communicates with the first termination device over the network. The authorized access WLAN allow communications with the central site via the second termination device over a tunnel coupling the first termination device to the second termination device, whereas the unauthorized access WLAN allows communications with the network via the second termination device.

A method is provided for communicating an IEEE 802.11 data packet from a wireless communication device to an entity in a restricted network segment of a central site. A termination device stores a wireless communication device database (WCDD) comprising: a list of wireless communication devices associated with the termination device indexed by respective MAC addresses of each wireless communication device, respective IP addresses of each wireless communication device, a WLAN which each wireless communication device is associated with, a mapping table of WLANs-to-VLANs, and a mapping table of WLANs-to-tunnels. According to this method, when a termination device receives an IEEE 802.11 data packet from a wireless communication device via an access point, the termination device determines, based on the IEEE 802.11 data packet, whether the wireless communication device is associated with one of: an authorized access WLAN and an unauthorized access WLAN. For example, according to one embodiment, the termination device determines, based on the source MAC address of the IEEE 802.11 data packet and information stored in the WCDD, whether a WLAN that the wireless communication device is associated with is an authorized access WLAN that is mapped to a tunnel. When the termination device determines that the WLAN that the wireless communication device is associated with is an authorized access WLAN that is mapped to a tunnel, the termination device removes a layer 2 (L2) header from the IEEE 802.11 data packet to generate a layer 3 data packet, encapsulates the layer 3 (L3) data packet with a GRE header and an outer IP header to generate a GRE-over-IP packet, and tunnels the GRE-over-IP packet over the open network via the GRE tunnel to the termination device.

A method is provided for communicating an IP data packet from an entity in a restricted network segment of a central site to an authorized wireless communication device. According to this method, when a termination device receives an IP data packet from an entity in the restricted network segment, the termination device removes a layer 2 (L2) header from the IP data packet, encapsulates the IP data packet with a GRE header and an outer IP header to generate a GRE-over-IP packet, and transmits the GRE-over-IP packet over the open network via a GRE tunnel to another termination device.

BRIEF DESCRIPTION OF THE DRAWINGS

The present invention will hereinafter be described in conjunction with the following drawing figures, wherein like numerals denote like elements.

FIG. 2 is a table illustrating some of the fields and mappings stored by a termination device in a wireless communication device database maintained by the termination device according to one embodiment of the present invention;

DETAILED DESCRIPTION OF THE INVENTION

Figure 1:
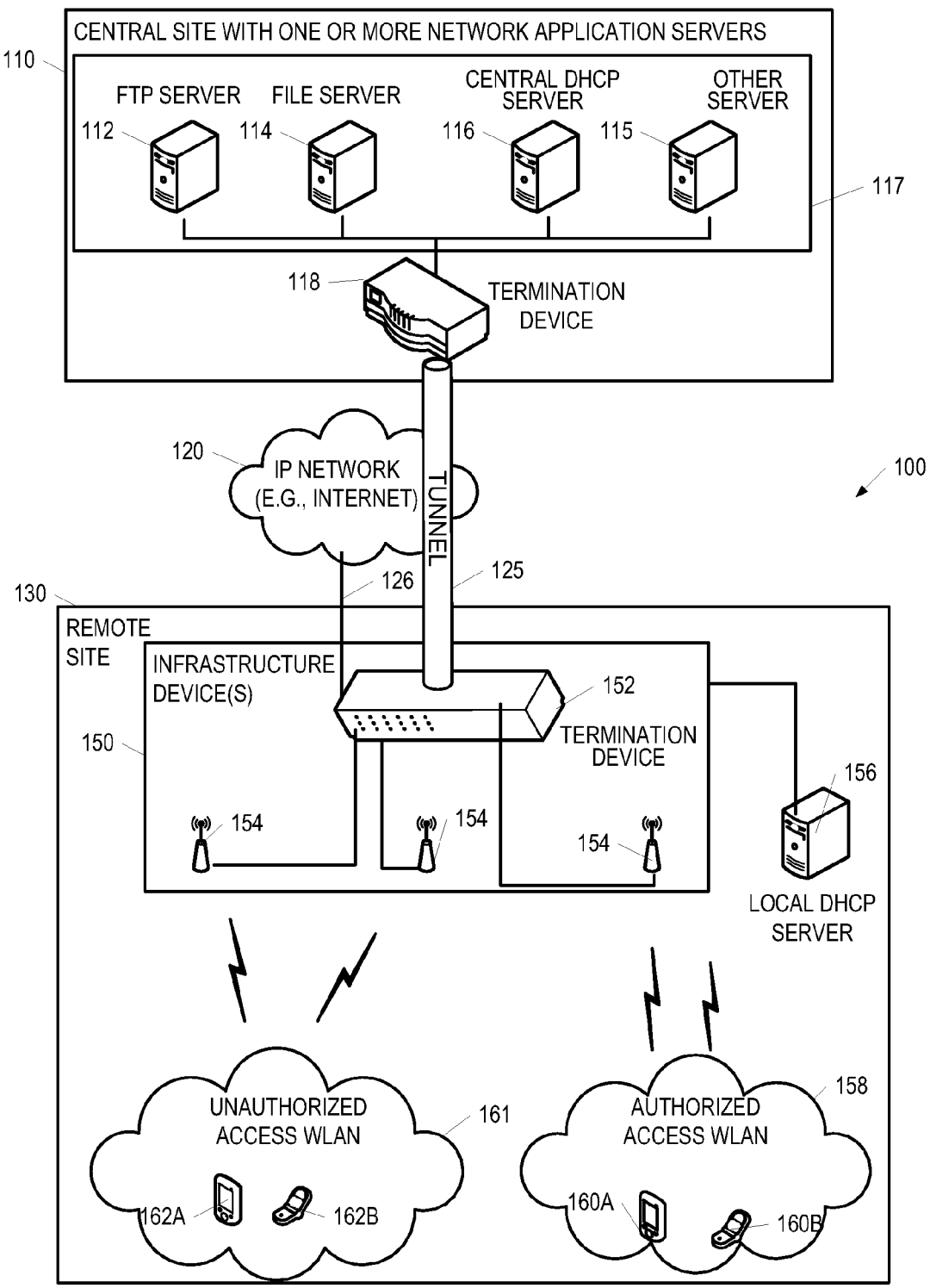
FIG. 1 illustrates an exemplary enterprise network according to one embodiment of the present invention.

The following detailed description of the invention is merely exemplary in nature and is not intended to limit the invention or the application and uses of the invention. Furthermore, there is no intention to be bound by any theory presented in the preceding background of the invention or the following detailed description of the invention.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Overview of Tunneling Protocols

Prior to describing one implementation of the present invention, a brief description of tunneling protocols will be provided. In general, a "tunneling protocol" refers to a network protocol which encapsulates a payload protocol, acting as a payload protocol, to provide a secure path or "tunnel" through an untrusted network. Although the following description specifies the use of a GRE tunnel and GRE-over-IP as the tunneling protocol, in other implementations other types of datagram-based tunneling protocols could be used such as including Internet Protocol Security (IPSec), a Layer 2 Tunneling Protocol (L2TP), IP in IP Tunneling, Multi-Protocol Label Switching (MPLS), Point-to-Point Tunneling Protocol (PPTP), etc.

As used herein, the term "Generic Routing Encapsulation (GRE)-over-Internet Protocol (IP)" refers to a tunneling protocol designed for encapsulation of arbitrary kinds of network layer packets inside arbitrary kinds of network layer packets. GRE can encapsulate a wide variety of protocol packet types inside IP tunnels. The original packet is the payload for the final packet. One benefit of GRE tunnels is that they are designed to be completely stateless, which means that each tunnel end point does not keep any information about the state or availability of the remote tunnel end point.

IPSec is a standard for securing Internet Protocol (IP) communications by encrypting and/or authenticating IP packets. IPSec provides a set of security protocols which operate at layer 3 (L3) of the OSI model commonly referred to as the network layer (or packet processing layer). For example, IPsec can be used for protecting both TCP and UDP-based protocols. IPSec is described in the following RFCs: RFC 2367 (PFKEY Interface), RFC 2403 (The Use of HMAC-MD5-96 within ESP and AH), RFC 2405 (The ESP DES-CBC Cipher Algorithm With Explicit IV), RFC 2410 (The NULL Encryption Algorithm and Its Use With Ipsec), RFC 2411 (IP Security Document Roadmap), RFC 2412 (The OAKLEY Key Determination Protocol), RFC 2451 (The ESP CBC-Mode Cipher Algorithms), RFC 2857 (The Use of HMAC-RIPEMD-160-96 within ESP and AH), RFC 3526 (More Modular Exponential (MODP) Diffie-Hellman groups for Internet Key Exchange (IKE)), RFC 3706 (A Traffic-Based Method of Detecting Dead Internet Key Exchange (IKE) Peers), RFC 3715 (IPsec-Network Address Translation (NAT) Compatibility Requirements), RFC 3947 (Negotiation of NAT-Traversal in the IKE), RFC 3948 (UDP Encapsulation of IPsec ESP Packets), RFC 4301 (Security Architecture for the Internet Protocol), RFC 4302 (IP Authentication Header), RFC 4303 (IP Encapsulating Security Payload (ESP)), RFC 4304 (Extended Sequence Number (ESN) Addendum to IPsec Domain of Interpretation (DOI) for Internet Security Association and Key Management Protocol (ISAKMP)), RFC 4305 (Cryptographic Algorithm Implementation Requirements for Encapsulating Security Payload (ESP) and Authentication Header (AH)), RFC 4306 Internet Key Exchange (IKEv2) Protocol, RFC 4307 Cryptographic Algorithms for Use in the Internet Key Exchange Version 2 (IKEv2), RFC 4308 (Cryptographic Suites for Ipsec), RFC 4309 (Using Advanced Encryption Standard (AES) CCM Mode with IPsec Encapsulating Security Payload (ESP)), etc.

Exemplary Enterprise Network

FIG. 1 illustrates an exemplary enterprise network 100 which comprises a central site 110 communicatively coupled to a remote site 130 by a network 120 according to one embodiment of the present invention. The network 120 may comprise, for example, the Internet or an intranet.

The enterprise network 100 includes a central site 110 which can be physically located, for example, at a main office of an enterprise, and a remote site 130 which can be physically located, for example, at another location such as a branch office of the enterprise. As used herein, the term "site" can refer to either a remote site or a physical site. As used herein, the term "physical site" refers to location such as a store or a warehouse. In many network configurations, a physical site may be configured with multiple remote sites. As used herein, the term "remote site" refers to a logical collection of servers, infrastructure devices such as wireless switches and/or access points/ports which can communicate with one or more wireless communication device(s). In some network configurations, a remote site may encompass multiple physical sites. Although FIG. 1 illustrates an exemplary network configuration which includes a single remote site 130, in many implementations, an enterprise network can include may be multiple remote sites (not shown). Some enterprise networks can include tens or hundreds or even thousands of remote sites configured as part of the enterprise network 100.

The central site 110 can include any of a number of different network entities, and some of the functions performed by the central site 110 include managing devices in the network 100, and providing applications and services to wireless communication devices in the network 100 that are authorized to access those applications and services. The central site can include a number of functional entities and devices which are not depicted in FIG. 1 for sake of convenience. In embodiments illustrated in FIG. 1, the central site 110 includes a termination device 118, and a restricted network segment 117 which includes one or more Network Application Servers (NASs). In one implementation, the restricted network segment 117 can be a corporate Intranet The central site 110 can include other entities (not shown). In this exemplary embodiment, the NASs illustrated in the restricted network segment 117 of FIG. 1 comprise a File Transfer Protocol (FTP) server 112, a file server 114, a DHCP server 116; however, in other embodiments the restricted network segment 117 can include other known types of application servers such as an e-mail server, an HTTP server, a Direct Connection Protocol (DCP)

server, an enterprise resource planning server, an application server, proxy server, telnet server, news server, audio-video streaming server, etc.

The termination device 118 allows for transmitting and/or receiving of packetized audio, video and/or data information as data packets. The termination device 118 is coupled to the network 120 that can provide information formatted as packetized audio, video and/or data information data packets. In one implementation, the termination device 118 can be an IP router with tunneling capability (e.g., Generic Routing Encapsulation (GRE)-over-Internet Protocol (IP) tunneling capability), where each interface on the IP router is associated with an independent IP subnet. As described below, the termination device 118 communicates with the termination device 152 over the open network 120.

The remote site 130 is communicatively coupled to the central site 110 via an open network 120 such as the Internet or an Intranet. The remote site 130 includes an infrastructure device 150 and is configured to include WLAN which includes an authorized access WLAN 158 and an unauthorized access WLAN 161. As used herein, the term "Wireless Local Area Network (WLAN)" refers to a network in which a wireless communication device can connect to a local area network (LAN) through a wireless (radio) connection. The IEEE 802.11 standard specifies features of exemplary wireless LANs. As used herein, the term "Virtual Local Area Network (VLAN)" refers to group of ports on an Ethernet switch that behave like a separate network segment. VLANs allow networks to be segmented logically without having to be physically rewired. Instead of having all ports on a switch being equal and belonging to the same network, ports can be segregated into groups, each belonging to a separate logical network. VLANs subdivide a physical LAN into multiple virtual local area networks or multiple smaller broadcast domains without needing additional network devices, such as routers, to do this. One switch may have several VLANs defined on it. A VLAN is identified using a special identification number called a VLAN ID. Stations attached to switch ports having the same VLAN ID act and function as though they are all on the same physical network segment. The VLAN ID is transmitted in every packet associated with that VLAN.

In general, the infrastructure device 150 may comprise a wireless communication device, such as, a wireless access point or a combination of a wireless switch and a wireless access port. In one embodiment, the infrastructure device 150 may be a wireless access point that complies with the IEEE 802.11 Standard or other wireless local area network (WLAN) Standards, a Bluetooth access point, or the like. As illustrated in FIG. 1, a local DHCP server 156 is coupled to the infrastructure device 150 and will be described below.

In the embodiment illustrated in FIG. 1, the infrastructure device 150 includes a termination device 152, such as a wireless switch with tunneling capability (e.g., Generic Routing Encapsulation (GRE)-over-Internet Protocol (IP) tunneling capability), coupled to one or more access points 154. As used herein, the term "wireless switch (WS)" refers to a device that channels incoming data from any of multiple input ports to the specific output port that will take the data toward its intended destination. A switch typically performs the data-link or layer 2 functions and determines, from the MAC address in each packet, which output port to use for the next part of its trip to the intended destination. In some embodiments, the switch can function as an IP switch which may also perform network or layer 3 routing functions. In addition, as used herein, the term "access point (AP)" refers to a device connected to a local area network (LAN) that enables remote wireless stations to communicate with the LAN. An AP is a network-capable device containing a transceiver and antenna for transmitting signals to and receiving signals from the remote stations. An AP serves as the point of interconnection between the WLAN and a fixed wire network and allows wireless communication devices to be quickly and easily connected to a wired LAN. Each AP can serve multiple users within a defined network area.

Wireless computing devices are also illustrated in FIG. 1. The wireless communication devices illustrated in FIG. 1 can be either "authorized" wireless communication devices 160A, 160B which are authorized to use services and access network applications provided via the restricted network segment 117, or "unauthorized" wireless communication devices 162A, 162B which are not allowed to use services and access network applications provided via the restricted network segment 117. As used herein, the term "wireless computing device" refers to any computer designed to communicate with an infrastructure device over an air interface through a wireless channel. In many cases such wireless computing devices are "handheld" and potentially mobile or "nomadic." A wireless communication device may be any one of a number of types of mobile computing devices including, but not limited to, a hand-held or laptop devices and personal computers, tablet Personal Computers (PCs), a PC card, compact flash, personal digital assistants (PDAs), mobile telephone handsets, and the like. It will be appreciated by those skilled in the art that although FIG. 1 shows an exemplary enterprise network configuration in which four wireless computing devices 160A, B, 162 A,B are communicating with the network, in many enterprise network implementations, hundreds or thousands of wireless computing devices can be configured as part of the network at any given time.

The infrastructure device 150 and the wireless computing devices associated with the remote site 130 may communicate with each other in accordance with any known communication standards such as those based on IEEE 802.11 (e.g., 802.11a, 802.11b, 802.11g, 802.11e, 802.11n or 802.11s) or 802.16 standards, Bluetooth, or any other packetized communication standard or packet data protocols such as TDMA (time division multiple access). As used herein, "IEEE 802.11" refers to a set of IEEE Wireless LAN (WLAN) standards that govern wireless networking transmission methods. IEEE 802.11 standards have been and are currently being developed by working group 11 of the IEEE LAN/MAN Standards Committee (IEEE 802). Any of the IEEE standards or specifications referred to herein may be obtained at http://standards.ieee.org/getieee802/index.html or by contacting the IEEE at IEEE, 445 Hoes Lane, PO Box 1331, Piscataway, N.J. 08855-1331, USA.

The unauthorized access wireless LAN 161 at the remote site 130 is designed to allow all wireless communication devices associated with it to communicate only with the "open network" via the access points 154 coupled to the termination device 152. For example, this can allow guest users and unauthorized enterprise users to communicate with the Internet, but not a restricted network segment at the central site 110. The termination device 152 (e.g., wireless switch) maps all traffic from these users to a local VLAN on the remote site, thus providing access only to the open network. As such, wireless users associated with the unauthorized access wireless LAN 161 are mapped to a local VLAN that provides access directly to the open network 120 via link 126 without tunneling data back to the central site 110.

The authorized access wireless LAN 158 is designed to allow all wireless communication devices associated with it to communicate with the restricted network at the central site 110, as well as the unrestricted open network 120, via the access point 154 and termination device 152 over an IP tunnel 125. Wireless users associated with the authorized access wireless LAN 158 get mapped to the IP tunnel 125 which tunnels all their traffic back up to the central site 110. Thus, the disclosed embodiments can allow authorized enterprise users (e.g., employees) to communicate with the restricted network at the central site 110, as well as the unrestricted open network 120, via the access point 154 and termination device 152 over tunnel 125. In the description that follows, the tunnel 125 will be described as a GRE tunnel 125; however, it will be appreciated that the tunnel 125 could be implemented using any of a number of other IP tunneling protocols including any of those described above.

The GRE tunnel 125 couples the termination device 118 to the termination device 152 and restricts access to network applications, data and services which are maintained at the central site 110. The GRE tunnel 125 includes a first tunnel endpoint of GRE tunnel 125 which terminates at the termination device 152 and a second tunnel end point of GRE tunnel 125 which terminates at the termination device 118. The authorized access wireless LAN 158 is mapped to the first tunnel endpoint of the GRE tunnel 125 and is accessible only by authorized wireless communication devices 160 A,B. Although FIG. 1 illustrates a single GRE tunnel 125, in other practical implementations, there may be multiple GRE tunnels which link multiple remote sites (not shown) to the central site 110. As such, only authorized wireless communication devices 160 A, B are allowed to communicate with the central site 110 via the infrastructure device 150 and to access, for example, network applications that are provided by NASs 112, 114, 116, 118 in the restricted network segment 117.

The local DHCP server 156 allocates IP addresses to "unauthorized" wireless communication devices 162A, 162B at the site 130 (e.g., guest users of the enterprise). By contrast, the DHCP server 116 maintains a special group of "authorized" IP addresses, and only allocates authorized IP addresses to "authorized" wireless communication devices 160A, 160B at the site 130.

FIG. 2 is a simplified table illustrating some of the fields and mappings stored by termination device 152 in a wireless communication device database 200 maintained by the termination device 152 according to one embodiment of the present invention. The termination device 152 maintains a wireless computing device database (WCDD) such as that illustrated as in FIG. 2.

As illustrated in FIG. 2 for each wireless communication device (WCD) listed in column 1 the Wireless Communication Device Database (WCDD) 200 includes information including a MAC address (column 2) of the particular wireless communication device, an IP Address (column 3) of the particular wireless communication device, an associated WLAN (column 4) for the particular wireless communication device, a WLAN-to-VLAN mapping (column 5) (if one exists) for the particular wireless communication device, and a WLAN-to-tunnel mapping (column 6) for the particular wireless communication device (if one exists). It should be noted that in the example illustrated in FIG. 2, the MAC addresses are expressed with an identifier ($MAC_{DEVICE}$), but are actually, for example, a 48-bit address space in hexadecimal format (with each octet separated by a dash or colon) that acts like a name for a particular network adapter. The MAC addresses can either be "universally administered addresses" or "locally administered addresses." As used herein, the term "Internet Protocol (IP) address" refers to a layer 3 address, and can be a number which identifies each sender or receiver of information packets across the Internet. Each communication from a user on the Internet carries an IP address of the source and destination networks and the particular machine within the network associated with the user or host computer at each end. An IP address generally comprises an identifier of a particular network on the Internet and an identifier of the particular device (which can be a server or a workstation) within that network. Although the IP addresses are expressed with an identifier ($IP_{DEVICE}$), but are actually an IPv4 or IPv6 address. IPv6 addresses are 128 bits long (as defined by RFC 4291) and usually expressed as eight groups of four hexadecimal digits, whereas IPv4 addresses are 32 bits and usually expressed in dot-decimal notation which comprises four octets in decimal separated by periods. IPv6 addresses are typically composed of two logical parts: a 64-bit (sub-)network prefix, and a 64-bit host part.

With respect to unauthorized WCD 162A, the WCCD 200 includes the following entries: MAC address is $MAC_{162A}$, IP address is $IP_{162A}$, the associated WLAN is unauthorized access WLAN 161, and the WLAN-to-VLAN mapping is unauthorized access WLAN 161-to-LOCAL VLAN 161 mapping. As described above, although FIG. 1 shows single instances of authorized access WLAN 158 and unauthorized access WLAN 161, in many practical implementations, there can be multiple instances of each. Notably, the WLAN-to-tunnel mapping is "NONE" since the WCD 162A is "unauthorized" is therefore not mapped to tunnel 125. Unauthorized WCD 162B includes similar entries except that the MAC address of Unauthorized WCD 162B is $MAC_{162B}$, and the IP address is $IP_{162B}$. By contrast, with respect to authorized WCD 160A, the WCCD 200 includes the following entries: MAC address is $MAC_{160A}$, IP address is $IP_{160A}$, the associated WLAN is authorized access WLAN 158, and the WLAN-to-tunnel mapping of authorized access WLAN 158 to tunnel 125. In this case, the authorized access WLAN 158 is not mapped to a VLAN. Authorized WCD 162B includes similar entries except that the MAC address of authorized WCD 160B is $MAC_{160B}$, and the IP address is $IP_{160B}$.

Data Plane Operation of the GRE Tunnel

In conventional GRE-over-IP tunneling, one subnet is implemented between the two termination devices, and another subnet is implemented between the remote termination device 152 and the wireless devices 160A, 160B in the authorized access WLAN 158 at the remote site 130. For example, the first subnet can have an IP address of 192.168.1.0/24, the tunnel interface at the central site 110 can have an IP address of 192.168.1.1, and the tunnel interface at the remote site 130 can have an IP address of 192.168.1.2. Although the first subnet can have an IP address of 192.168.1.0/24, the wireless devices 160A, 160B in the authorized access WLAN 158 would have, for instance, IP addresses 192.168.2.10, 192.168.2.11 respectively, and the termination device interface on this subnet would be 192.168.2.1. As such, a conventional termination device 152 requires routing between the subnets 192.168.1.0 and 192.168.2.0 in order to communicate between them. Also, access control policies that restrict communication between the authorized access WLAN 158 at the remote site 130 and unauthorized access WLAN 161 at the remote site 130 have to be enforced at the remote site 130. This approach can be problematic for a number of reasons. For instance, if the unauthorized devices 162A, 162B are in subnet 172.20.15.80/24, it would be necessary to implement security restrictions at the termination device 152 to prevent communication between the authorized access WLAN 158 (192.168.2.0) and the unauthorized access WLAN 161 (172.20.15.80). When there are a large number of remote sites like remote site 130, this approach is inefficient since a network administrator must manage security policies at hundreds or even thousands of remote termination devices 152.

In contrast to conventional GRE-over-IP tunneling performed at a remote termination device 152, embodiments of the present invention eliminate the need for IP routing by extending the IP subnet from the central site 110 to the authorized access WLAN 158 at the remote site 130 via the tunnel 125. As a result, the wireless devices 160A, 160B in the authorized access WLAN 158 are in the same IP subnet as the tunnel interface of the termination device 118 at the central site 110, and no IP routing is necessary at the termination device 152 located at the remote site 130. For instance, if it is assumed that the IP address of the first subnet is 192.168.1.0/24, that the IP address of the tunnel interface at the central site 110 is 192.168.1.1, and that the IP address of wireless devices 160A, 160B are 192.168.1.10, 192.168.1.11, respectively, then no IP routing is required.

Some of the advantages associated with this approach are as follows. One exemplary advantage is that all security policies can be managed at the termination device 118 at the central site 110, rather than at each termination device 152 at each of the remote sites 130. As a result, management of security policies is greatly simplified when there are a large number of remote sites 130 (e.g. hundreds/thousands of stores). Another exemplary advantage is that communications on the authorized access WLAN 158 is completely segregated and isolated in that communications on the authorized access WLAN 158 are only transmitted or received via the tunnel 125 and can not flow into to the unauthorized access WLAN 161 and vice versa. Yet another exemplary advantage is that non-IP traffic can be carried from the central site 110 to the remote site 130. Thus, if the central site 110 has, for example, an IPX network which is coupled to the termination device 118, the traffic can be bridged all the way to the wireless devices 160A, 160B with IPX addresses in the authorized access WLAN 158. Still another exemplary advantage is that broadcast/multicast (BCMC) communications can be handled transparently all the way from the central site 110 to the authorized access WLAN 158.

Figure 3:
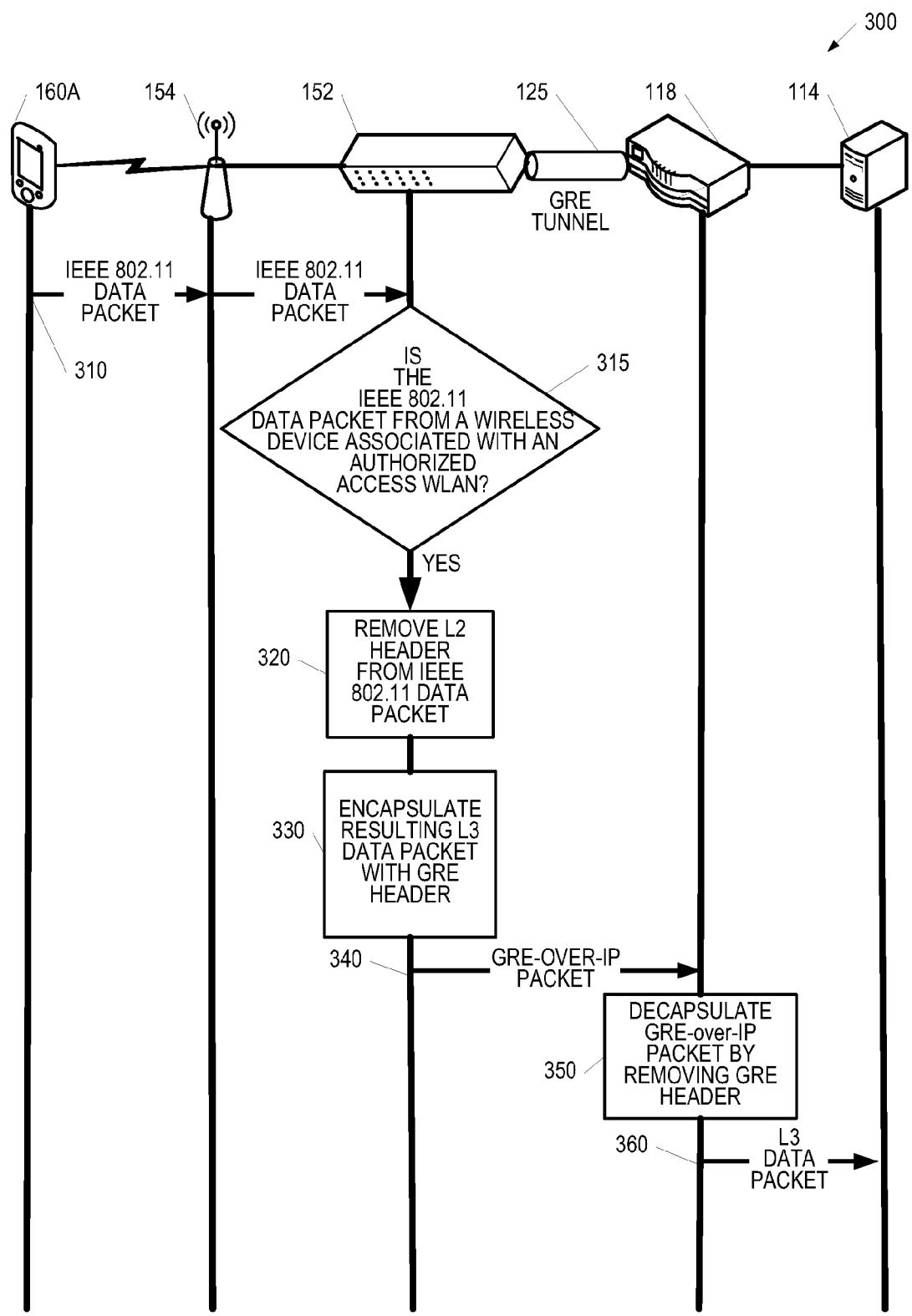
FIG. 3 is a flowchart illustrating data plane operation of the enterprise network of FIG. 1 during communication of an IEEE 802.11 data packet from an authorized wireless communication device to an entity in the restricted network segment of the central site in accordance with some embodiments of the present invention.

Data plane operation of the GRE tunnel 125 will now be described with reference to FIGS. 2 and 3. FIG. 3 is a flowchart illustrating data plane operation 300 of the enterprise network 100 of FIG. 1 during communication of an IEEE 802.11 data packet from an authorized wireless communication device 160A to an entity in the restricted network segment 117 of the central site 110 in accordance with some embodiments of the present invention.

At step 310, the termination device 152 receives an IEEE 802.11 data packet containing IP data from the authorized wireless communication device 160A via access point 154. The IEEE 802.11 data packet can be an IP data packet or a non-IP packet such as an ARP data packet, an IPX data packet, etc.

As described above, the termination device 152 maintains a WCDD 200. The WCDD 200 includes all of wireless communication devices indexed by their respective MAC addresses. The WCDD 200 also contains other information about the wireless communication devices including: the IP address of each wireless communication device, and the WLAN which the wireless communication device is associated with. The WCDD 200 also contains a mapping table of WLANs-to-VLANs, and WLANs-to-Tunnels. Thus, for each wireless communication device, the WCDD maintains a mapping table which maps a MAC address of the wireless communication device to an IP address and associated WLAN.

To determine how to route the IEEE 802.11 data packet, at step 315, the termination device 152 checks to determine whether the IEEE 802.11 data packet is from a wireless communication device associated with an authorized access WLAN (such as WLAN 158) or is from a wireless communication device associated with an unauthorized access WLAN (such as WLAN 161). To do so, in one implementation, when termination device 152 receives an IEEE 802.11 data packet from a wireless communication device, the termination device 152 determines the source MAC address of the IEEE 802.11 data packet and performs a look up in the WCDD 200 (based on the source MAC address) to determine whether the WLAN that the wireless communication device 160A is associated with is mapped to a tunnel. In this example, based on the source MAC address, the termination device 152 determines that the IEEE 802.11 data packet is associated with the authorized access WLAN 158 (that is mapped to the tunnel 125) so the process proceeds to step 320.

Alternatively, although not illustrated in FIG. 3, when the termination device 152 determines that the IEEE 802.11 data packet is from a wireless communication device associated with an unauthorized access WLAN that is mapped to a local VLAN (such as WLAN 161), the termination device 152 sends or "switches" the IEEE 802.11 data packet to a destination on the open network 120 (e.g., Internet).

At step 320, because WLAN 158 is mapped to the tunnel 125, the termination device 152 removes the layer 2 (L2) header from the IEEE 802.11 data packet to generate a layer 3 data packet. At step 330, the termination device 152 encapsulates the layer 3 (L3) data packet with a GRE header and an outer IP header to generate a GRE-over-IP packet. At step 340, the termination device 152 transmits or "tunnels" the GRE-over-IP packet over the open network 120 via the GRE tunnel 125 to the termination device 118.

At step 350, the termination device 118 decapsulates the GRE-over-IP packet by removing the outer IP header and the GRE header to generate the layer 3 (L3) data packet. Here, the L3 data packet can be an IP data packet or a non-IP data packet such as an ARP data packet, an IPX data packet, etc.

At step 360, the termination device 118 routes the layer 3 (L3) data packet to an entity in the restricted network segment 117, which, in this example, is file server 114 located at the central site 110.

Figure 4:
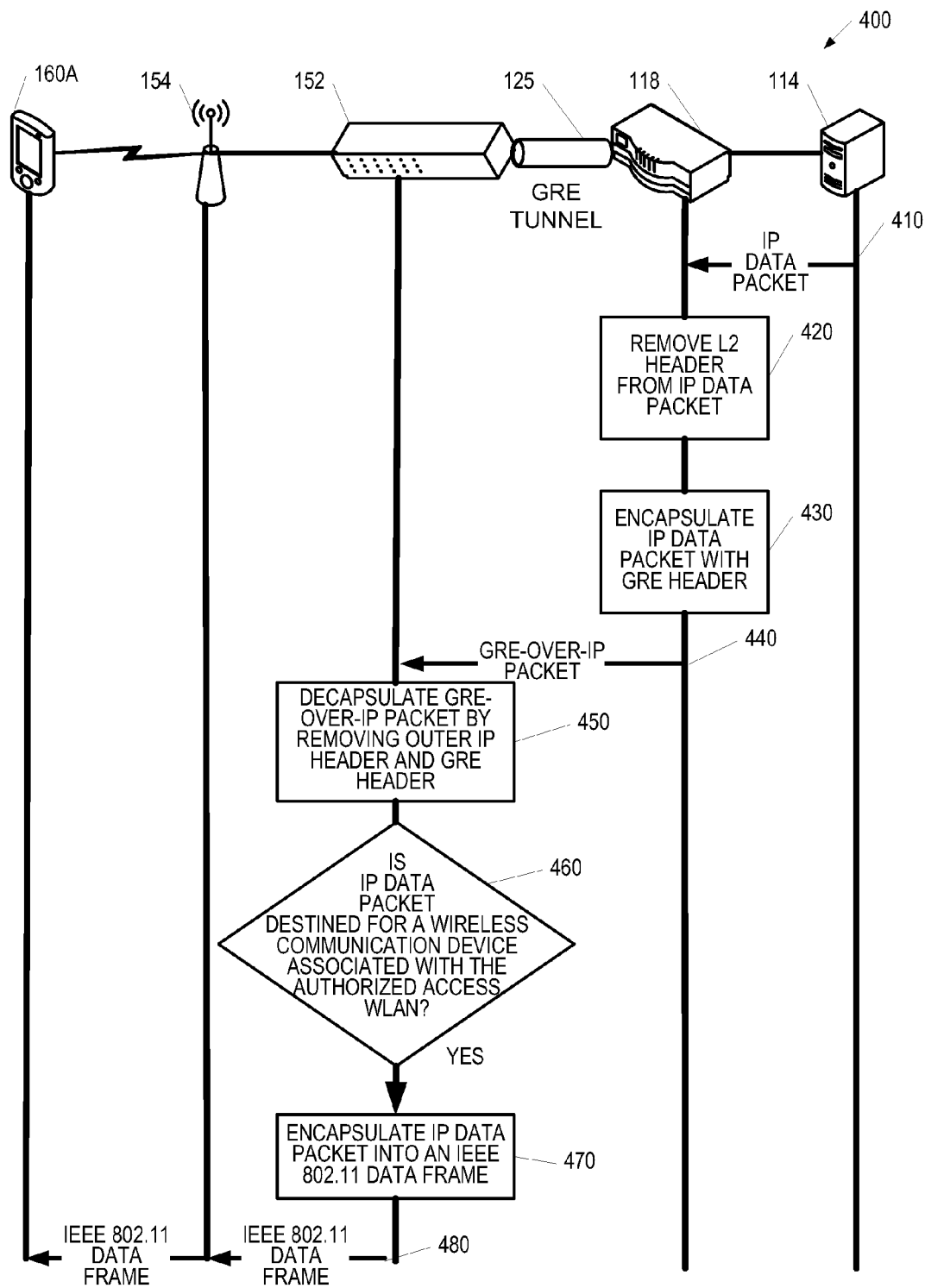
FIG. 4 is a flowchart illustrating data plane operation of the enterprise network of FIG. 1 during communication of an IP data packet from an entity in the restricted network segment of the central site to an authorized wireless communication device in accordance with some embodiments of the present invention.

FIG. 4 is a flowchart illustrating data plane operation of the enterprise network 100 of FIG. 1 during communication of an IP data packet from an entity in the restricted network segment 117 of the central site 110 to an authorized wireless communication device 160A in accordance with some embodiments of the present invention. As used herein, the term "Internet Protocol (IP)" include protocols other than IP and can be generally include protocols such as IPX, AppleTalk and any other Layer 3 protocols that termination device 152 may support.

At step 410, the termination device 118 receives an IP data packet from an entity in the restricted network segment 117, which, in this example is file server 114. At step 420, the termination device 118 removes a layer 2 (L2) header from the IP data packet. At step 430, the termination device 118 encapsulates the IP data packet with a GRE header and an outer IP header to generate a GRE-over-IP packet. At step 440, the termination device 118 transmits the GRE-over-IP packet over the open network 120 via the GRE tunnel 125 to the termination device 152.

At step 450, the termination device 152 receives the GRE-over-IP packet, and decapsulates the GRE packet by removing the outer IP header and the GRE header to generate the original IP data packet.

At step 460, the termination device 152 checks to determine whether the inner IP data packet is destined for a wireless communication device associated with an authorized access WLAN (such as WLAN 158) based on a destination IP address of the inner IP data packet. In one implementation, the termination device 152 determines the destination IP address of the inner IP data packet, and determines, based on the destination IP address of the inner IP data packet, whether the inner IP data packet belongs to a wireless communication device that is associated with a WLAN that is mapped to the tunnel on which the inner IP data packet was received. If the destination IP address of the inner IP data packet matches an IP address of a wireless communication device in the authorized access WLAN 158 (which is mapped to the GRE tunnel 125), this means that the inner IP data packet is destined for an "authorized" wireless communication device since any wireless communication devices associated with the authorized access WLAN 158 are "authorized." If the destination IP address of the inner IP data packet is an IP address of a wireless communication device that is associated with a WLAN that is mapped to the tunnel on which the inner IP data packet was received (such as authorized access WLAN 158 which is mapped to the GRE tunnel 125), then the process proceeds to step 470, where the termination device 152 encapsulates the IP data packet into an IEEE 802.11 data frame having a MAC address associated with the destination wireless communication device, and transmits the IEEE 802.11 data frame over-the-air (OTA) to the destination wireless communication device at step 480.

Although not illustrated in FIG. 4, when the destination IP address of the IP data packet does not match the IP address of any of the wireless communication device in the authorized access WLAN 158 (i.e., if the inner IP data packet belongs to a wireless communication device that is associated with a WLAN that is not mapped to the tunnel), then the termination device 152 drops the inner IP data packet.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A method for communicating a data packet from a wireless communication device to an entity in a restricted network segment of a central site in an enterprise network, comprising:

storing, at a wireless switch that is coupled to a plurality of access ports and being located at a remote site in the enterprise network, a wireless communication device database (WCDD) comprising: a list of wireless communication devices associated with the wireless switch indexed by respective MAC addresses of each wireless communication device, respective addresses of each wireless communication device, a WLAN which each wireless communication device is associated with, a mapping table of WLANs-to-VLANs, and a mapping table of WLANs-to-tunnels;

receiving, at the wireless switch, the data packet from a wireless communication device via an access port coupled to the wireless switch;

determining, at the wireless switch based on the data packet, whether the wireless communication device is associated with one of:

an unauthorized access WLAN; and an authorized access WLAN that is mapped to a Generic Routing Encapsulation (GRE) tunnel implemented over the IP network and that is designed to allow communications with an IP router at the central site via the wireless switch over the GRE tunnel, wherein the GRE tunnel extends an IP subnet from the central site to the authorized access WLAN.

2. A method according to claim 1, wherein the step of determining, at the wireless switch based on the data packet, whether the wireless communication device is associated with one of: an authorized access WLAN and an unauthorized access WLAN, comprises:

determining the source MAC address of the data packet; and determining, at the wireless switch based on the source MAC address of the data packet and information stored in the WCDD, whether a WLAN that the wireless communication device is associated with is an authorized access WLAN that is mapped to a Generic Routing Encapsulation (GRE) tunnel.

3. A method according to claim 2, when the wireless switch determines that the WLAN that the wireless communication device is associated with is an authorized access WLAN that is mapped to a Generic Routing Encapsulation (GRE) tunnel, further comprising:

removing, at the wireless switch, a layer 2 (L2) header from the data packet to generate a layer 3 data packet;

encapsulating, at the wireless switch, the layer 3 (L3) data packet with a GRE header and an outer IP header to generate a GRE-over-IP packet; and tunneling, from the wireless switch, the GRE-over-IP packet over the open network via the GRE tunnel to the IP router.

4. A method according to claim 3, further comprising:

decapsulating, at the IP router, the GRE-over-IP packet by removing the outer IP header and the GRE header to generate the layer 3 (L3) data packet; and transmitting, from the IP router, the layer 3 (L3) data packet to an entity in the restricted network segment located at the central site.

5. A method according to claim 1, when the wireless switch determines that the WLAN that the wireless communication device is associated with is an unauthorized access WLAN, further comprising:

transmitting, from the wireless switch, via an access port coupled to the wireless switch, the data packet to a destination on an IP network.

6. A method for communicating a Layer 3 data packet from an entity in a restricted network segment of a central site in an enterprise network to an authorized wireless communication device at a remote site in the enterprise network, the method comprising:

receiving, at an IP router, the Layer 3 data packet from an entity in the restricted network segment;

removing, at the IP router, a layer 2 (L2) header from the Layer 3 data packet;

encapsulating, at the IP router, the Layer 3 data packet with a GRE header and an outer IP header to generate a GRE-over-IP packet;

transmitting, from the IP router, the GRE-over-IP packet over a Generic Routing Encapsulation (GRE) tunnel that couples the IP router to a wireless switch having an access port coupled thereto;

receiving, at the wireless switch, the GRE-over-IP packet; and decapsulating, at the wireless switch, the GRE-over-IP packet by removing the outer IP header and the GRE header to generate an inner data packet; and storing, at the wireless switch, a wireless communication device database (WCDD) comprising: a list of wireless communication devices associated with the wireless switch indexed by respective MAC addresses of each wireless communication device, respective addresses of each wireless communication device, a WLAN which each wireless communication device is associated with, a mapping table of WLANs-to-VLANs, and a mapping table of WLANs-to-tunnels.

7. A method according to claim 6, further comprising:

determining, at the wireless switch, whether the inner data packet is destined for a wireless communication device associated with an authorized access WLAN that is mapped to a tunnel based on a destination address of the inner data packet and information stored in the WCDD.

8. A method according to claim 7, further comprising:

when the inner data packet is destined for a wireless communication device associated with an authorized access WLAN that is mapped to a tunnel, encapsulating the inner data packet into a data frame having a MAC address associated with the destination wireless communication device; and transmitting the data frame over-the-air (OTA) to the destination wireless communication device via an access port coupled to the wireless switch.

\* \* \* \* \*

UNITED STATES PATENT AND TRADEMARK OFFICE
CERTIFICATE OF CORRECTION

PATENT NO. : 7,961,725 B2  
APPLICATION NO. : 11/831315  
DATED : June 14, 2011  
INVENTOR(S) : Nagarajan et al.

Page 1 of 1

It is certified that error appears in the above-identified patent and that said Letters Patent is hereby corrected as shown below:

In Column 4, Line 60, delete "Intranet" and insert -- Intranet. --, therefor.

In Column 8, Line 17, delete "WCCD" and insert -- WCDD --, therefor.

In Column 8, Line 31, delete "WCCD" and insert -- WCDD --, therefor.

Signed and Sealed this
Twenty-seventh Day of November, 2012

David J. Kappos
*Director of the United States Patent and Trademark Office*